Oct. 7, 1924. 1,511,092
E. B. PETERSEN ET AL
EGG HOLDING MEANS
Filed Aug. 4, 1923
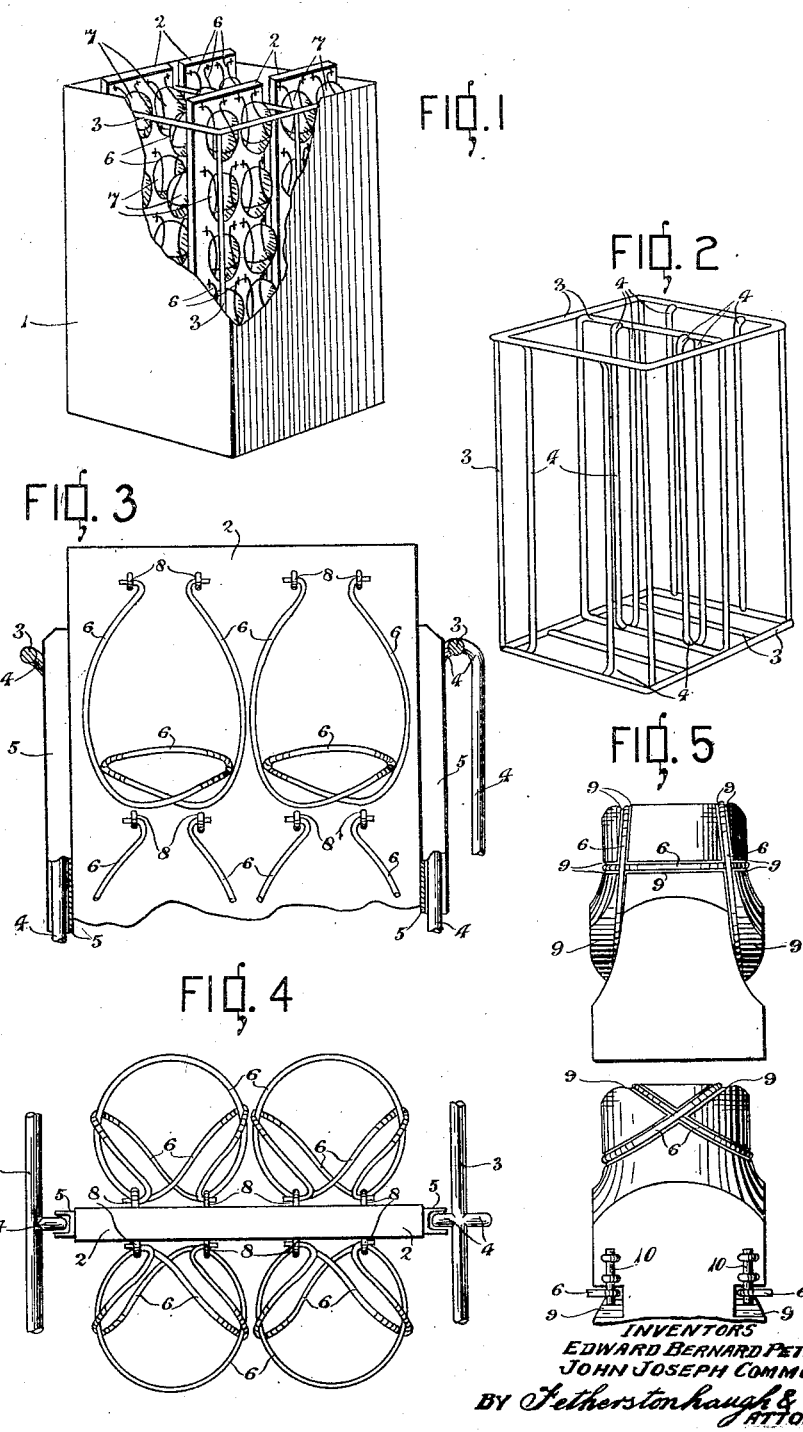
INVENTORS
EDWARD BERNARD PETERSEN.
JOHN JOSEPH COMMONS.
BY Fetherstonhaugh & Co.
ATTORNEYS Patented Oct. 7, 1924.

1,511,092

UNITED STATES PATENT OFFICE.

EDWARD BERNARD PETERSEN AND JOHN JOSEPH COMMONS, OF CHRISTCHURCH, NEW ZEALAND.

EGG-HOLDING MEANS.

Application filed August 4, 1923. Serial No. 655,755.

*To all whom it may concern:*

Be it known that we, EDWARD BERNARD PETERSEN and JOHN JOSEPH COMMONS, both subjects of the King of Great Britain, residing at 36 St. James Avenue, Papanui, Christchurch, in the Dominion of New Zealand, and 54 Grafton Street, Linwood, Christchurch, aforesaid, respectively, have invented new and useful Improvements in and Relating to Egg-Holding Means, of which the following is a specification.

This invention relates to a holder for eggs and has been designed more particularly for holding eggs when immersed in a preservative liquid.

It is the object of the present invention to provide a simple and novel construction for this purpose capable of being easily and inexpensively manufactured and by means of which the eggs will be compactly arranged in the desired vertical positions, the said construction being such as to permit of eggs being placed in position or removed without inserting the hand in the vessel in which such eggs are adapted to be contained.

In order that the nature of the invention and its construction may be clearly understood, reference will now be made to the accompanying sheet of drawings in which:—

Fig. 1. is a perspective view of a vessel or container in which eggs are carried by the means forming the subject of the present invention, a portion of the wall of such container being shown broken away in order to clearly illustrate the internal arrangement, Fig. 2. is a perspective view of the frame employed in mounting the slides upon which the eggs are carried, Fig 3. is an elevation showing upon a somewhat larger scale a portion of one of the slides together with a portion of the frame by means of which it is mounted, Fig. 4. is a plan view of the same, and Fig. 5. shows two opposite sides of a mandril or former upon which a length of wire is wound in the required manner to constitute one of the cages employed upon the slides to carry the eggs.

As here shown 1 is a suitable vessel or container which may conveniently consist of a tin or can such as those commonly employed for packing kerosene and the like.

According to the present invention there are arranged within the said container one or more vertically disposed slides 2 each carried in guides which permit of such slides being moved vertically for the purpose of inserting them in the vessel 1 or withdrawing them therefrom. The said guides may be attached to or formed integral with the walls of the vessel 1.

In the preferred form of the construction however, for the purpose of so mounting the slides there is provided as here shown a frame 3 composed of wire or other suitable material and adapted to be removably inserted in the vessel 1, such frame including vertical guide-members 4 for the said slides 2.

The said slides 2, which may be composed of wood, sheet-metal or other suitable material are provided at their vertical edges with channel-shaped formations 5 adapted to slidably receive the guide-members 4, as clearly shown in Figs. 3 and 4. If so desired, however, the guide-members 4 may be of channel-shape and adapted to receive the lateral edges of the slides or any suitable formation provided thereon.

Attached to one or both faces of the slides 2 are cages 6 adapted to receive the eggs 7 and support the latter in the desired vertical positions, as shown in Fig. 1.

In the preferred form of the construction as here shown, each of the cages 6 consists of a length of wire having its central or intermediate portion bent round to provide a loop within which the end or point of the egg is adapted to rest while the two end portions of such wire are bent to extend upwardly one at either side of the loop and their upper extremities are suitably hooked as shown in order that they may be received by eyes 8 provided upon the slide 2.

The said eyes and hooked formations will therefore constitute hingeable connections whereby the cage depends from the face of the slide and consequently should the latter be inclined or tilted from its vertical position, the cages at one side of such slide will be permitted to turn upon their said hinges and so retain their eggs in a vertical position.

In manufacture a cage of this nature may be simply and quickly made by the use of a mandril or former as illustrated in Fig. 5 and consisting of a block of wood, metal or the like. The said mandril is formed with a groove 9 which extends in a virtually horizontal direction around its front and lateral sides while at the rear side the two portions of the groove forming the termination of the horizontal portion, extend upwardly at an angle in opposite directions so as to intersect each other and pass over the top of the mandril. The two said end portions of the groove continue in downwardly directions at the front side of the mandril past the said horizontal portion then pass with a curve around the lateral sides of such mandril to the rear side where at the terminations of the groove vertical pins 10 are provided.

The arrangement is such that the wire from which the cage is to be formed will be wound in the said groove commencing with the central portion of such wire which is placed in the horizontal portion of the groove while the two end portions of such wire will follow the groove to the terminations thereof and at which latter points the ends of the wire will be placed to the inner sides of the two pins and then bent outwardly around such pins in order to provide the desired hooked formations.

In practice the means may be employed either for holding eggs in a dry condition or immersed in a liquid preservative, in which latter case the vessel 1 will be filled with the liquid to the required height.

In either case however, for the purpose of placing the eggs in position or removing them from the cages any of the slides will be drawn upward thus rendering any of the cages conveniently accessible without disarranging the remainder of the eggs or inserting the hand within the vessel. Where the slides are mounted as here shown by means of a frame also the latter may be withdrawn from the vessel as a whole.

We claim:—

1. Egg-holding means comprising the combination with a container open at its upper end, a frame removably inserted therein, vertical guide-members upon said frame, and vertically disposed egg-carrying slides movable vertically in said guide-members.

2. Egg-holding means comprising the combination with a vertical surface of egg-carrying cages attached thereto and each consisting of a length of wire bent at its intermediate portion to form a loop to receive the end of the egg while the two end portions of such wire are bent upwardly on either side of said loop and attached to said vertical surface.

3. Egg-holding means as defined in claim 2 characterized in that the extremities of said wire are formed with hooks which are received in eyes provided upon said vertical surface.

In testimony whereof we affix our signatures in presence of two witnesses.

EDWARD BERNARD PETERSEN.
JOHN JOSEPH COMMONS.

Witnesses:
SIDNEY JAMES TRELEAVEN,
KATHLEEN DWYLLIS KING.